Patented Mar. 16, 1943

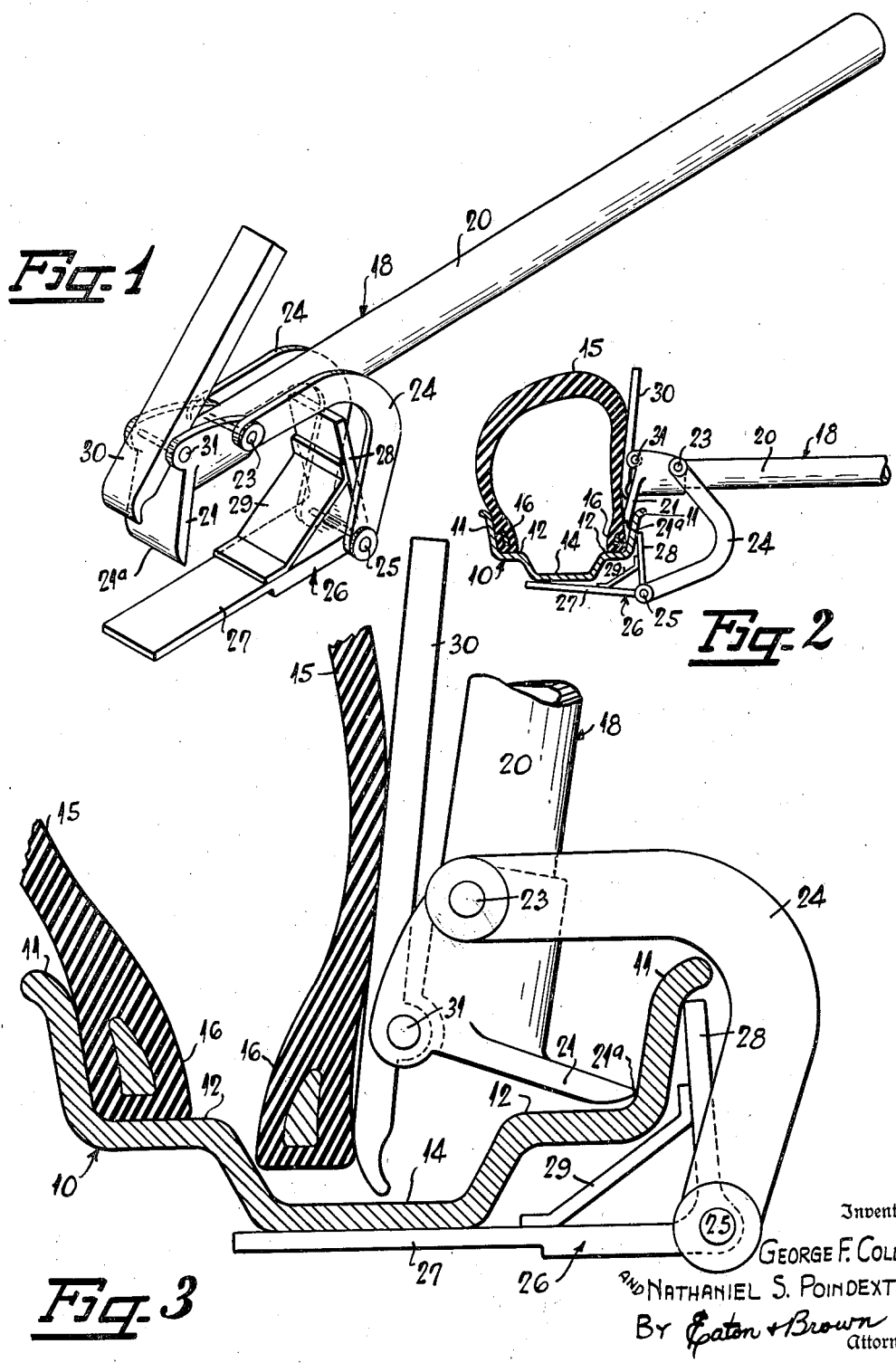

2,314,127

UNITED STATES PATENT OFFICE 2,314,127

TIRE TOOL

George F. Colley and Nathaniel S. Poindexter, Winston-Salem, N. C.

Application March 21, 1942, Serial No. 435,618

2 Claims. (Cl. 157—6)

This invention relates to automobile accessories and more especially to a tool designed to assist in removing a pneumatic tire from the rim upon which it is mounted.

The present invention is particularly adaptable for removing tires from what is commonly known as "drop-center" rims. These rims have a pair of spaced, radially disposed, peripheral flanges between which the beads of a tire are confined. About midway between the flanges an annular depression is provided which has a shorter radius from the wheel center than the radius of the tire bead. When removing the tire it is first necessary to move the tire bead away from its confining flange and into the annular depression so that the diametrically opposed portion of the tire bead may be slipped over its adjacent flange portion and off the rim. Such a construction permits a relatively unyielding tire bead to be easily mounted upon or dismounted from a rim.

Due to the fact that rims are usually made from steel there is a tendency for the flanges and adjacent metal to rust and thus form a bond between the tire bead and the rim. This bond must be broken before the tire can be removed from the rim; and in doing so great care should be taken to protect the tire and tube from injury.

It is therefore an object of this invention to provide a tire tool of the class described which is capable of gently and effectively breaking the bond between the tire bead and rim, and thereafter forcing the bead into the drop-center portion of the rim during a continuous operation. Specifically, the structure comprises an L-shaped handle, having one leg adapted to initially fit between the rim flange and tire bead while a pivoted cradle engages the opposite side of the rim to serve as an anchor. A bar is pivoted to the handle and is disposed adjacent the inserted leg. This bar presses the side wall of the tire inwardly toward the drop-center portion of the rim while the L-shaped handle rotates about the end of the inserted leg as a pivot, at the same time using the flange as a resting point.

It is another object of this invention to provide a tire tool which is simple in construtcion, efficient in operation, and economical to manufacture.

Some of the objects of the invention having been stated, other objects will appear when the description proceeds, when taken in connection with the accompanying drawing, in which—

Figure 1 is an isometric view of the improved tire tool;

Figure 2 is a sectional view through a tire rim and tire, showing the initial position of the tool prior to breaking the bond between the tire bead and rim;

Figure 3 is an enlarged detail sectional view through a tire and rim, showing the position of the tool after one of the tire beads has been forced into the drop-center portion of the rim.

Referring more particularly to the drawing, the numeral 10 broadly designates a tire rim of a conventional "drop-center" construction. This rim has a pair of spaced parallel radial flanges 11, and adjacent spaced bead supporting surfaces 12. Likewise, the surfaces 12 are circular, but are disposed at an angle to the inner side walls of the flanges. About midway between the spaced surfaces 12 a drop-center portion 14 is provided which has a shorter radius than either the flanges 11 or the surfaces 12.

The rim is adapted to support a pneumatic tire casing 15, said tire having bead portions 16 which normally engage the inner side walls of the flanges and the adjacent supporting surfaces 12 when in an installed position. As heretofore stated the rim often rusts and forms a bond between the tire beads 16, and surfaces 12, and also between the tire beads and the inner side walls of flanges 11, thereby making it very difficult to remove the tire.

In order to easily and effectively break this bond and move the beads into the drop-center cavity 14 a tire tool 18 is provided.

This tool comprises a handle 20 having a toe portion 21 integral with one end thereof and extending substantially at right angles thereto. In other words, the handle is substantially L-shaped and the leg portion 21 is adapted to be inserted between the outer side wall of bead 16 and the inner side wall of flange 11. Pivotally secured to the handle 20 as at 23 is a pair of L-shaped links 24, the lower ends of said links having pivotally secured thereto as at 25, a cradle member 26. This cradle member has legs 27 and 28 which are disposed substantially at right angles to each other. In order to reinforce these legs and hold them in fixed position relative to each other, a diagonal brace 29 is employed. When the tool is placed in the position shown in Figure 2, the leg 27 fits beneath portion 14 of the rim 10, whereas the leg 28 fits against the outer side wall of the rim flange 11. As the handle 20 is rotated in a counter-clockwise manner, the end 21a of the leg portion 21 presses against the inner side wall of flange 11 and gradually slides downwardly between this side wall and the outer wall of bead 16 to thereby separate the contacting surfaces.

It is necessary that substantially the entire depth of the tire side wall be engaged while the tire tool is being rotated as described above, because injury to the tire is likely to occur unless a proper bearing surface is provided. Therefore, a flat bar 30 is pivoted intermediate its ends as at 31 to the tire tool. This point 31 is located substantially at the intersection of handle 20 and leg portion 21. Regardless of what position the members 20 and 21 may occupy, the bar 30 will always remain against the side wall of the tire. The position of the handle 20 and leg portion 21 in Figure 3 is substantially changed from the initial position shown in Figure 2, but even in this position the bar 30 remains against the tire side wall; however the bar has moved downwardly a considerable amount and forced the associated tire bead into the drop-center portion 14 of the tire rim. Attention is called to the fact that the toe portion 21a of leg 21 has also moved downwardly a substantial amount in Figure 3 where it is disposed adjacent the surface 12. When the parts are in the position shown in Figure 3, the L-shaped links 24 still serve as a tie between the cradle 26 and the handle 20 thereby holding the toe portion 21a and the lower end of bar 30 in position against the normal tendency of the tire to urge the same outwardly. These links 24 should be substantially L-shaped in order to clear flange 11 when the tool is in the position shown in Figure 3. It is thus seen that the cradle 10 serves as an anchor to which the members 20, 21 and 30 are tied during the rotation of the tire tool from the position shown in Figure 2 to the position shown in Figure 3.

When one bead 16 has been forced into the drop-center portion 14, and identical operation is performed upon the other bead thereby causing both beads to be disposed side by side in drop-center portion 14, and also to cause the beads to be broken loose from surface 12 and flanges 11. When this operation is performed the bead portions which are diametrically opposed to the bead portions which are in the drop-center portion 14, may be pulled over the periphery of flange 11 to thereby remove the tire from the rim.

In the drawing and specification, there has been set forth a preferred embodiment of the invention, and although specific terms are employed, they are used in a generic and descriptive sense only and not for purposes of limitation, the scope of the invention being defined in the claims.

We claim:

1. A tire tool for removing pneumatic casings from rims having radially disposed flanges against which the beads of a casing are adapted to fit, comprising a base member having a portion adapted to fit against the central portion of the rim, and also having a laterally projecting leg adapted to fit against the exterior of a radially disposed flange, a substantially L-shaped link having one of its ends pivoted to the base member and having its free end adapted to travel over the radially disposed flange, a lever pivoted intermediate its ends to the free end of the L-shaped link and having a laterally projecting tongue adapted to pass between the radially disposed flange of the rim and the bead on the casing, a second lever pivoted intermediate its ends to the tongue end of the first-named lever and adapted to lie flush against the tongue of the first-named lever when the tongue is inserted between the flange of the rim and the bead of the casing, so that after the first-named lever has been swung on its pivot to move the bead away from the rim flange, the second lever can be swung on its pivot to move the bead further away from the rim flange.

2. A tool for removing pneumatic tires from a supporting rim having radially disposed spaced flanges for confining the beads of a tire therebetween, comprising a substantially L-shaped member, the long leg of which is adapted to fit against the central exterior portion of the rim, and the short leg being adapted to fit against the exterior of one of the flanges, a second L-shaped member having one end pivoted to the first L-shaped member and projecting alongside one of the flanges of the rim, a handle having a laterally projecting tongue on one end thereof, said handle being pivoted at a point removed from the base of the tongue to the other end of the second L-shaped member, a lever pivoted to the end of the handle at the base of the tongue, the tongue and the free end of the lever being adapted to be inserted between the rim flange and tire bead, whereby after the handle is swung on its pivot to move the tire bead away from the flange, the lever can be swung on its pivot to move the tire bead further away from the flange.

his
GEORGE F. X COLLEY.
mark

Witnesses as to the mark
of George F. Colley:
MILDRED B. SMITH,
W. L. WILSON.

NATHANIEL S. POINDEXTER.